(12) United States Patent
Boardman et al.

(10) Patent No.: US 10,935,245 B2
(45) Date of Patent: Mar. 2, 2021

(54) ANNULAR CONCENTRIC FUEL NOZZLE ASSEMBLY WITH ANNULAR DEPRESSION AND RADIAL INLET PORTS

(71) Applicant: General Electric Company, Schenectady, NY (US)

(72) Inventors: Gregory Allen Boardman, Liberty Township, OH (US); Manampathy Gangadharan Giridharan, Mason, OH (US); Michael Anthony Benjamin, Cincinnati, OH (US); Pradeep Naik, Bangalore (IN); Clayton Stuart Cooper, Loveland, OH (US); Vishal Sanjay Kediya, Akot (IN)

(73) Assignee: General Electric Company, Schenectady, NY (US)

( * ) Notice: Subject to any disclaimer, the term of this patent is extended or adjusted under 35 U.S.C. 154(b) by 379 days.

(21) Appl. No.: 16/196,383

(22) Filed: Nov. 20, 2018

(65) Prior Publication Data
US 2020/0158343 A1 May 21, 2020

(51) Int. Cl.
*F23R 3/28* (2006.01)
*F02C 7/22* (2006.01)
(52) U.S. Cl.
CPC ............. *F23R 3/286* (2013.01); *F02C 7/22* (2013.01); *F05D 2240/35* (2013.01)
(58) Field of Classification Search
CPC .......... F23R 3/286; F23R 3/283; F23R 3/343; F23R 3/18; F23R 3/20; F23R 3/36
See application file for complete search history.

(56) References Cited

U.S. PATENT DOCUMENTS 2,565,843 A   8/1951   Dennison
3,917,173 A   11/1975  Singh
(Continued)

FOREIGN PATENT DOCUMENTS

EP     1391653 A2      2/2004
WO     WO2008/071902 A1   6/2008

OTHER PUBLICATIONS

GE U.S. Appl. No. 15/909,211, filed Mar. 1, 2018.
(Continued)

*Primary Examiner* — Jason H Duger
*Assistant Examiner* — Todd N Jordan
(74) *Attorney, Agent, or Firm* — Dority & Manning, P.A.

(57) ABSTRACT

A fuel nozzle for a gas turbine engine is generally provided. The fuel nozzle includes an outer sleeve extended circumferentially around a fuel nozzle centerline and extended along a longitudinal direction substantially co-directional to the fuel nozzle centerline. The outer sleeve defines a plurality of first radially oriented air inlet ports through the outer sleeve in circumferential arrangement relative to the fuel nozzle centerline. The fuel nozzle further includes a centerbody positioned radially inward of the outer sleeve. The centerbody is extended along the longitudinal direction substantially co-directional to the fuel nozzle centerline and wherein the centerbody is concentric to the fuel nozzle centerline and the outer sleeve. The centerbody defines a plurality of second radially oriented air inlet ports through the centerbody in circumferential arrangement relative to the fuel nozzle centerline. The centerbody further defines an annular centerbody groove or depression relative to the fuel nozzle centerline at a downstream end directly adjacent to a combustion chamber. The fuel nozzle further includes an inner sleeve extended circumferentially around the fuel nozzle centerline and extended along the longitudinal direc- (Continued)

tion substantially co-directional to the fuel nozzle centerline. The inner sleeve is positioned radially between the outer sleeve and the centerbody. The inner sleeve further defines an annular inner sleeve depression relative to the fuel nozzle centerline at the downstream end directly adjacent to the combustion chamber. The outer sleeve and the inner sleeve together define a first fuel air mixing passage radially therebetween and extended substantially along the longitudinal direction in direct fluid communication with the combustion chamber. The inner sleeve and the centerbody together further define a second fuel air mixing passage radially therebetween and extended substantially along the longitudinal direction in direct fluid communication with the combustion chamber.

20 Claims, 6 Drawing Sheets

(56) References Cited

U.S. PATENT DOCUMENTS

| | | | |
|---|---|---|---|
| 3,946,552 | A | 3/1976 | Weinstein et al. |
| 3,972,182 | A | 8/1976 | Salvi |
| 3,980,233 | A | 9/1976 | Simmons et al. |
| 4,100,733 | A | 7/1978 | Striebel et al. |
| 4,177,637 | A | 12/1979 | Pask |
| 4,215,535 | A | 8/1980 | Lewis |
| 4,222,232 | A | 9/1980 | Robinson |
| 4,226,083 | A | 10/1980 | Lewis et al. |
| 4,262,482 | A | 4/1981 | Roffe et al. |
| 4,408,461 | A | 10/1983 | Bruhwiler et al. |
| 4,412,414 | A | 11/1983 | Novick et al. |
| 4,463,568 | A * | 8/1984 | Willis .................. F23D 17/002 60/742 |
| 4,689,961 | A | 9/1987 | Stratton |
| 4,763,481 | A | 8/1988 | Cannon |
| 4,967,561 | A | 11/1990 | Bruhwiler et al. |
| 5,121,597 | A | 6/1992 | Urushidani et al. |
| 5,207,064 | A | 5/1993 | Ciokajlo et al. |
| 5,211,675 | A | 5/1993 | Bardey et al. |
| 5,235,814 | A | 8/1993 | Leonard |
| 5,251,447 | A | 10/1993 | Joshi et al. |
| 5,263,325 | A | 11/1993 | McVey et al. |
| 5,265,409 | A | 11/1993 | Smith, Jr. et al. |
| 5,307,634 | A | 5/1994 | Hu |
| 5,339,635 | A | 8/1994 | Iwai et al. |
| 5,351,477 | A | 10/1994 | Joshi et al. |
| 5,373,693 | A | 12/1994 | Zarzalis et al. |
| 5,511,375 | A | 4/1996 | Joshi et al. |
| 5,592,821 | A | 1/1997 | Alary et al. |
| 5,619,855 | A | 4/1997 | Burrus |
| 5,622,054 | A | 4/1997 | Tingle |
| 5,791,137 | A | 8/1998 | Evans et al. |
| 5,816,049 | A | 10/1998 | Joshi |
| 5,829,967 | A | 11/1998 | Chyou |
| 5,839,283 | A | 11/1998 | Dobbeling |
| 5,862,668 | A | 1/1999 | Richardson |
| 5,881,756 | A | 3/1999 | Abbasi et al. |
| 5,937,653 | A | 8/1999 | Alary et al. |
| 6,016,658 | A | 1/2000 | Willis et al. |
| 6,038,861 | A | 3/2000 | Amos et al. |
| 6,161,387 | A * | 12/2000 | Green .................. F23R 3/14 60/742 |
| 6,272,840 | B1 | 8/2001 | Crocker et al. |
| 6,286,298 | B1 | 9/2001 | Burrus et al. |
| 6,295,801 | B1 | 10/2001 | Burrus et al. |
| 6,331,109 | B1 | 12/2001 | Paikert et al. |
| 6,367,262 | B1 | 4/2002 | Mongia et al. |
| 6,442,939 | B1 | 9/2002 | Stuttaford et al. |
| 6,460,339 | B2 | 10/2002 | Nishida et al. |
| 6,539,721 | B2 | 4/2003 | Oikawa et al. |
| 6,539,724 | B2 | 4/2003 | Cornwell et al. |
| 6,543,235 | B1 | 4/2003 | Crocker et al. |
| 6,564,555 | B2 | 5/2003 | Rice et al. |
| 6,594,999 | B2 | 7/2003 | Mandai et al. |
| 6,598,584 | B2 | 7/2003 | Beck et al. |
| 6,609,376 | B2 | 8/2003 | Rokke |
| 6,662,564 | B2 | 12/2003 | Bruck et al. |
| 6,742,338 | B2 | 6/2004 | Tanaka et al. |
| 6,772,594 | B2 | 8/2004 | Nishida et al. |
| 6,837,050 | B2 | 1/2005 | Mandai et al. |
| 6,837,051 | B2 | 1/2005 | Mandai et al. |
| 6,915,637 | B2 | 7/2005 | Nishida et al. |
| 6,962,055 | B2 | 11/2005 | Chen et al. |
| 7,036,482 | B2 | 5/2006 | Beck et al. |
| 7,093,445 | B2 | 8/2006 | Corr, II et al. |
| 7,107,772 | B2 | 9/2006 | Chen et al. |
| 7,117,677 | B2 | 10/2006 | Inoue et al. |
| 7,188,476 | B2 | 3/2007 | Inoue et al. |
| 7,200,998 | B2 | 4/2007 | Inoue et al. |
| 7,284,378 | B2 | 10/2007 | Amond, III et al. |
| 7,313,919 | B2 | 1/2008 | Inoue et al. |
| 7,343,745 | B2 | 3/2008 | Inoue et al. |
| 7,360,363 | B2 | 4/2008 | Mandai et al. |
| 7,434,401 | B2 | 10/2008 | Hayashi |
| 7,469,544 | B2 | 12/2008 | Farhangi |
| 7,516,607 | B2 | 4/2009 | Farhangi et al. |
| 7,546,740 | B2 | 6/2009 | Chen et al. |
| 7,565,803 | B2 | 7/2009 | Li et al. |
| 7,610,759 | B2 | 11/2009 | Yoshida et al. |
| 7,631,500 | B2 * | 12/2009 | Mueller .................. F23R 3/286 239/399 |
| 7,677,026 | B2 | 3/2010 | Conete et al. |
| 7,762,074 | B2 | 7/2010 | Bland et al. |
| 7,770,397 | B2 | 8/2010 | Patel et al. |
| 7,788,929 | B2 | 9/2010 | Biebel et al. |
| 7,810,333 | B2 | 10/2010 | Kraemer et al. |
| 7,841,180 | B2 | 11/2010 | Kraemer et al. |
| 7,871,262 | B2 | 1/2011 | Carroni et al. |
| 7,966,801 | B2 | 6/2011 | Umeh et al. |
| 8,033,112 | B2 | 10/2011 | Milsavljevic et al. |
| 8,033,821 | B2 | 10/2011 | Eroglu |
| 8,057,224 | B2 | 11/2011 | Knoepfel |
| 8,161,751 | B2 | 4/2012 | Hall |
| 8,225,591 | B2 | 7/2012 | Johnson et al. |
| 8,225,613 | B2 | 7/2012 | Sisco et al. |
| 8,234,871 | B2 | 8/2012 | Davis, Jr. et al. |
| 8,276,385 | B2 | 10/2012 | Zuo et al. |
| 8,316,644 | B2 | 11/2012 | Wilbraham |
| 8,322,143 | B2 | 12/2012 | Uhm et al. |
| 8,327,643 | B2 | 12/2012 | Yamamoto et al. |
| 8,347,630 | B2 | 1/2013 | Lovett et al. |
| 8,375,721 | B2 | 2/2013 | Wilbraham |
| 8,424,311 | B2 | 4/2013 | York et al. |
| 8,438,851 | B1 | 5/2013 | Uhm et al. |
| 8,511,087 | B2 | 8/2013 | Fox et al. |
| 8,528,337 | B2 | 9/2013 | Berry et al. |
| 8,539,773 | B2 | 9/2013 | Ziminsky et al. |
| 8,550,809 | B2 | 10/2013 | Uhm et al. |
| 8,590,311 | B2 | 11/2013 | Parsania et al. |
| 8,621,870 | B2 | 1/2014 | Carroni et al. |
| 8,671,691 | B2 | 3/2014 | Boardman et al. |
| 8,683,804 | B2 | 4/2014 | Boardman et al. |
| 8,701,417 | B2 | 4/2014 | Nicholls et al. |
| 8,752,386 | B2 | 6/2014 | Fox et al. |
| 8,850,820 | B2 | 10/2014 | Milsavljevic et al. |
| 8,863,524 | B2 | 10/2014 | Karlsson et al. |
| 8,938,971 | B2 | 1/2015 | Poyyapakkam et al. |
| 8,943,835 | B2 | 2/2015 | Corsmeier et al. |
| 9,091,444 | B2 | 7/2015 | Turrini et al. |
| 9,134,023 | B2 | 9/2015 | Boardman et al. |
| 9,182,123 | B2 | 11/2015 | Boardman et al. |
| 9,335,050 | B2 | 5/2016 | Cunha et al. |
| 9,377,192 | B2 | 6/2016 | Hirata et al. |
| 9,388,985 | B2 | 7/2016 | Wu et al. |
| 9,416,973 | B2 | 8/2016 | Melton et al. |
| 9,423,137 | B2 | 8/2016 | Nickolaus |
| 9,488,108 | B2 * | 11/2016 | Ryon .................. F15D 1/08 |
| 9,534,781 | B2 | 1/2017 | Hughes et al. |
| 9,759,426 | B2 | 9/2017 | Johnson et al. |
| 9,810,152 | B2 | 11/2017 | Genin et al. |
| 9,822,981 | B2 | 11/2017 | Ciani et al. |

(56) References Cited

U.S. PATENT DOCUMENTS

| | | | |
|---|---|---|---|
| 9,835,333 B2 | 12/2017 | Antoniono et al. | |
| 10,132,500 B2* | 11/2018 | Ryon | F23R 3/14 |
| 10,161,633 B2* | 12/2018 | Chew | F23R 3/14 |
| 10,295,190 B2* | 5/2019 | Boardman | F23R 3/28 |
| 2002/0083711 A1 | 7/2002 | Dean et al. | |
| 2003/0101729 A1 | 6/2003 | Srinivasan | |
| 2006/0021350 A1 | 2/2006 | Sanders | |
| 2007/0028618 A1* | 2/2007 | Hsiao | F23R 3/343 60/737 |
| 2007/0099142 A1 | 5/2007 | Flohr et al. | |
| 2007/0227148 A1 | 10/2007 | Bland et al. | |
| 2007/0259296 A1 | 11/2007 | Knoepfel | |
| 2008/0083229 A1 | 4/2008 | Haynes et al. | |
| 2008/0163627 A1* | 7/2008 | ELKady | F23D 14/62 60/737 |
| 2008/0280239 A1 | 11/2008 | Carroni et al. | |
| 2009/0056338 A1 | 3/2009 | Cazalens et al. | |
| 2009/0173075 A1 | 7/2009 | Miura et al. | |
| 2009/0173076 A1 | 7/2009 | Toon | |
| 2009/0293484 A1 | 12/2009 | Inoue et al. | |
| 2010/0050644 A1 | 3/2010 | Pidcock et al. | |
| 2010/0083663 A1 | 4/2010 | Fernandes et al. | |
| 2010/0186412 A1 | 7/2010 | Stevenson et al. | |
| 2010/0236247 A1 | 9/2010 | Davis, Jr. et al. | |
| 2010/0275601 A1 | 11/2010 | Berry et al. | |
| 2011/0000215 A1 | 1/2011 | Lacy et al. | |
| 2011/0016866 A1 | 1/2011 | Boardman et al. | |
| 2011/0016871 A1 | 1/2011 | Kraemer et al. | |
| 2011/0083439 A1 | 4/2011 | Zuo et al. | |
| 2011/0252803 A1 | 10/2011 | Subramanian et al. | |
| 2011/0265482 A1 | 11/2011 | Parsania et al. | |
| 2011/0289933 A1 | 12/2011 | Boardman et al. | |
| 2012/0096866 A1 | 4/2012 | Khan et al. | |
| 2012/0131923 A1 | 5/2012 | ELKady et al. | |
| 2012/0258409 A1 | 10/2012 | Mansour et al. | |
| 2012/0279223 A1 | 11/2012 | Barker et al. | |
| 2012/0285173 A1 | 11/2012 | Poyyapakkam et al. | |
| 2012/0292408 A1 | 11/2012 | Short | |
| 2013/0042625 A1 | 2/2013 | Barker et al. | |
| 2013/0046625 A1 | 2/2013 | Grigg et al. | |
| 2013/0067920 A1 | 3/2013 | Fox et al. | |
| 2013/0074510 A1 | 3/2013 | Berry | |
| 2013/0101729 A1 | 4/2013 | Keremes et al. | |
| 2013/0101943 A1 | 4/2013 | Uhm et al. | |
| 2013/0177858 A1 | 7/2013 | Boardman et al. | |
| 2013/0199188 A1 | 8/2013 | Boardman et al. | |
| 2013/0239581 A1 | 9/2013 | Johnson et al. | |
| 2013/0318977 A1 | 12/2013 | Berry et al. | |
| 2013/0336759 A1 | 12/2013 | Christians | |
| 2014/0033718 A1 | 2/2014 | Manoharan et al. | |
| 2014/0053571 A1 | 2/2014 | Keener et al. | |
| 2014/0060060 A1 | 3/2014 | Bernero et al. | |
| 2014/0090400 A1 | 4/2014 | Stuttaford et al. | |
| 2014/0096502 A1 | 4/2014 | Karlsson et al. | |
| 2014/0290258 A1 | 10/2014 | Gerendas et al. | |
| 2015/0076251 A1 | 3/2015 | Berry | |
| 2015/0128607 A1 | 5/2015 | Lee | |
| 2015/0159875 A1 | 6/2015 | Berry et al. | |
| 2016/0010856 A1 | 1/2016 | Biagioli et al. | |
| 2016/0061452 A1 | 3/2016 | Walker et al. | |
| 2016/0169110 A1 | 6/2016 | Myers et al. | |
| 2016/0209036 A1 | 7/2016 | Cheung | |
| 2016/0265779 A1 | 9/2016 | Haynes et al. | |
| 2016/0290650 A1 | 10/2016 | Abd El-Nabi et al. | |
| 2016/0313007 A1 | 10/2016 | Martini et al. | |
| 2017/0260866 A1 | 9/2017 | Meadows et al. | |
| 2017/0328570 A1 | 11/2017 | Lee | |
| 2017/0350598 A1 | 12/2017 | Boardman et al. | |
| 2018/0128491 A1 | 5/2018 | Boardman et al. | |
| 2018/0172273 A1 | 6/2018 | Purcell et al. | |
| 2018/0178229 A1 | 6/2018 | Ryon et al. | |
| 2018/0187892 A1 | 7/2018 | Patel et al. | |
| 2018/0195725 A1 | 7/2018 | Bennett et al. | |
| 2019/0032559 A1* | 1/2019 | Dai | F23C 7/004 |
| 2019/0309950 A1* | 10/2019 | Prociw | F23R 3/286 |
| 2020/0124286 A1* | 4/2020 | Doh | F23R 3/286 |
| 2020/0158343 A1* | 5/2020 | Boardman | F02C 7/22 |

OTHER PUBLICATIONS

U.S. Appl. No. 15/343,601, filed Nov. 4, 2016.
U.S. Appl. No. 15/343,634, filed Nov. 4, 2016.
U.S. Appl. No. 15/343,672, filed Nov. 4, 2016.
Srinivasan et al., Improving low load combustion, stability, and emissions in pilot-ignited natural gas engines, Journal of Automobile Engineering, Sage journals, vol. 220, No. 2, Feb. 1, 2006, pp. 229-239.
Snyder et al., Emission and Performance of a Lean-Premixed Gas Fuel Injection System for Aeroderivative Gas Turbine Engines, Journal of Engineering for Gas Turbines and Power, ASME Digital Collection, vol. 118, Issue 1, Jan. 1, 1996, pp. 38-45.

* cited by examiner

ANNULAR CONCENTRIC FUEL NOZZLE ASSEMBLY WITH ANNULAR DEPRESSION AND RADIAL INLET PORTS

FIELD

The present subject matter relates generally to gas turbine engine combustion assemblies. More particularly, the present subject matter relates to a premixing fuel nozzle assembly for gas turbine engine combustors.

BACKGROUND

Aircraft and industrial gas turbine engines include a combustor in which fuel is burned to input energy to the engine cycle. Typical combustors incorporate one or more fuel nozzles whose function is to introduce liquid or gaseous fuel into an air flow stream so that it can atomize and burn. General gas turbine engine combustion design criteria include optimizing the mixture and combustion of a fuel and air to produce high-energy combustion while minimizing emissions such as carbon monoxide, carbon dioxide, nitrous oxides, and unburned hydrocarbons, as well as minimizing combustion tones due, in part, to pressure oscillations during combustion. Additionally, general gas turbine engine combustion design must produce gas turbine engine operability at full power condition as well as part power conditions without producing undesirable emissions outputs or pressure oscillations.

Therefore, a need exists for a fuel nozzle or combustion assembly that may produce high-energy combustion while minimizing emissions and combustion instability at full power and part power conditions.

BRIEF DESCRIPTION

Aspects and advantages of the invention will be set forth in part in the following description, or may be obvious from the description, or may be learned through practice of the invention.

An aspect of the present disclosure is directed to a fuel nozzle for a gas turbine engine. The fuel nozzle includes an outer sleeve extended circumferentially around a fuel nozzle centerline and extended along a longitudinal direction substantially co-directional to the fuel nozzle centerline. The outer sleeve defines a plurality of first radially oriented air inlet ports through the outer sleeve in circumferential arrangement relative to the fuel nozzle centerline. The fuel nozzle further includes a centerbody positioned radially inward of the outer sleeve. The centerbody is extended along the longitudinal direction substantially co-directional to the fuel nozzle centerline and wherein the centerbody is concentric to the fuel nozzle centerline and the outer sleeve. The centerbody defines a plurality of second radially oriented air inlet ports through the centerbody in circumferential arrangement relative to the fuel nozzle centerline. The centerbody further defines an annular centerbody groove or depression relative to the fuel nozzle centerline at a downstream end directly adjacent to a combustion chamber. The fuel nozzle further includes an inner sleeve extended circumferentially around the fuel nozzle centerline and extended along the longitudinal direction substantially co-directional to the fuel nozzle centerline. The inner sleeve is positioned radially between the outer sleeve and the centerbody. The inner sleeve further defines an annular inner sleeve depression relative to the fuel nozzle centerline at the downstream end directly adjacent to the combustion chamber. The outer sleeve and the inner sleeve together define a first fuel air mixing passage radially therebetween and extended substantially along the longitudinal direction in direct fluid communication with the combustion chamber. The inner sleeve and the centerbody together further define a second fuel air mixing passage radially therebetween and extended substantially along the longitudinal direction in direct fluid communication with the combustion chamber.

In one embodiment, the first fuel air mixing passage is extended circumferentially around the fuel nozzle centerline between the outer sleeve and the inner sleeve.

In another embodiment, the second fuel air mixing passage is extended circumferentially around the fuel nozzle centerline between the inner sleeve and the centerbody.

In various embodiments, the outer sleeve, the inner sleeve, and the centerbody are together in concentric arrangement relative to the fuel nozzle centerline. In one embodiment, the first fuel air mixing passage and the second fuel air mixing passage are in concentric arrangement relative to the fuel nozzle centerline.

In still various embodiments, the fuel nozzle further includes an end wall positioned at an upstream end of the fuel nozzle, in which the end wall is coupled to the outer sleeve, the inner sleeve, and the centerbody. In one embodiment, the end wall defines a first fuel injection port in fluid communication with the first fuel air mixing passage, in which the end wall is configured to provide a flow of fuel to the first fuel air mixing passage via the first fuel injection port. In another embodiment, the plurality of first radially oriented air inlet ports are defined directly radially outward of a first fuel injection exit opening defined at the first fuel injection port in direct fluid communication with the first fuel air mixing passage. In still another embodiment, the first fuel injection port is extended substantially along the longitudinal direction.

In still various embodiments, the end wall defines a second fuel injection port in fluid communication with the second fuel air mixing passage, in which the end wall is configured to provide a flow of fuel to the second fuel air mixing passage via the second fuel injection port. In one embodiment, the plurality of second radially oriented air inlet ports are defined directly radially inward of a second fuel injection exit opening defined at the second fuel injection port in direct fluid communication with the second fuel air mixing passage. In another embodiment, the second fuel injection port is extended substantially along the longitudinal direction.

In one embodiment, the centerbody defines a substantially radially oriented centerbody fuel injection port configured to provide a jet-in-crossflow flow of fuel to the second fuel air mixing passage.

In another embodiment, the centerbody defines a substantially longitudinally oriented centerbody fuel injection port configured to provide a substantially longitudinal flow of fuel to the combustion chamber.

In still another embodiment, the inner sleeve defines a plurality of third radially oriented air inlet ports through the inner sleeve in circumferential arrangement relative to the fuel nozzle centerline.

In yet another embodiment, the first fuel air mixing passage defines a first exit height at the downstream end of the first fuel air mixing passage directly adjacent to the combustion chamber, in which the first exit height is between an inner surface of the outer sleeve and an outer surface of the inner sleeve, and further wherein the first exit height is between approximately 0.25 centimeters and approximately 0.90 centimeters.

In still yet another embodiment, the second fuel air mixing passage defines a second exit height at the downstream end of the second fuel air mixing passage directly adjacent to the combustion chamber, in which the second exit height is between an inner surface of the inner sleeve and an outer surface of the centerbody, and further wherein the second exit height is between approximately 0.25 centimeters and approximately 0.90 centimeters.

In one embodiment, the annular centerbody depression defines a substantially semi-circular cross sectional centerbody depression into the centerbody.

In another embodiment, the annular inner sleeve depression defines a substantially semi-circular cross sectional depression into the inner sleeve.

Another aspect of the present disclosure is directed to a gas turbine engine including a combustion section including a combustor assembly defining a combustion chamber. The combustion section further includes the fuel nozzle disposed adjacent to the combustion chamber configured to provide a flow of fuel to the combustion chamber.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
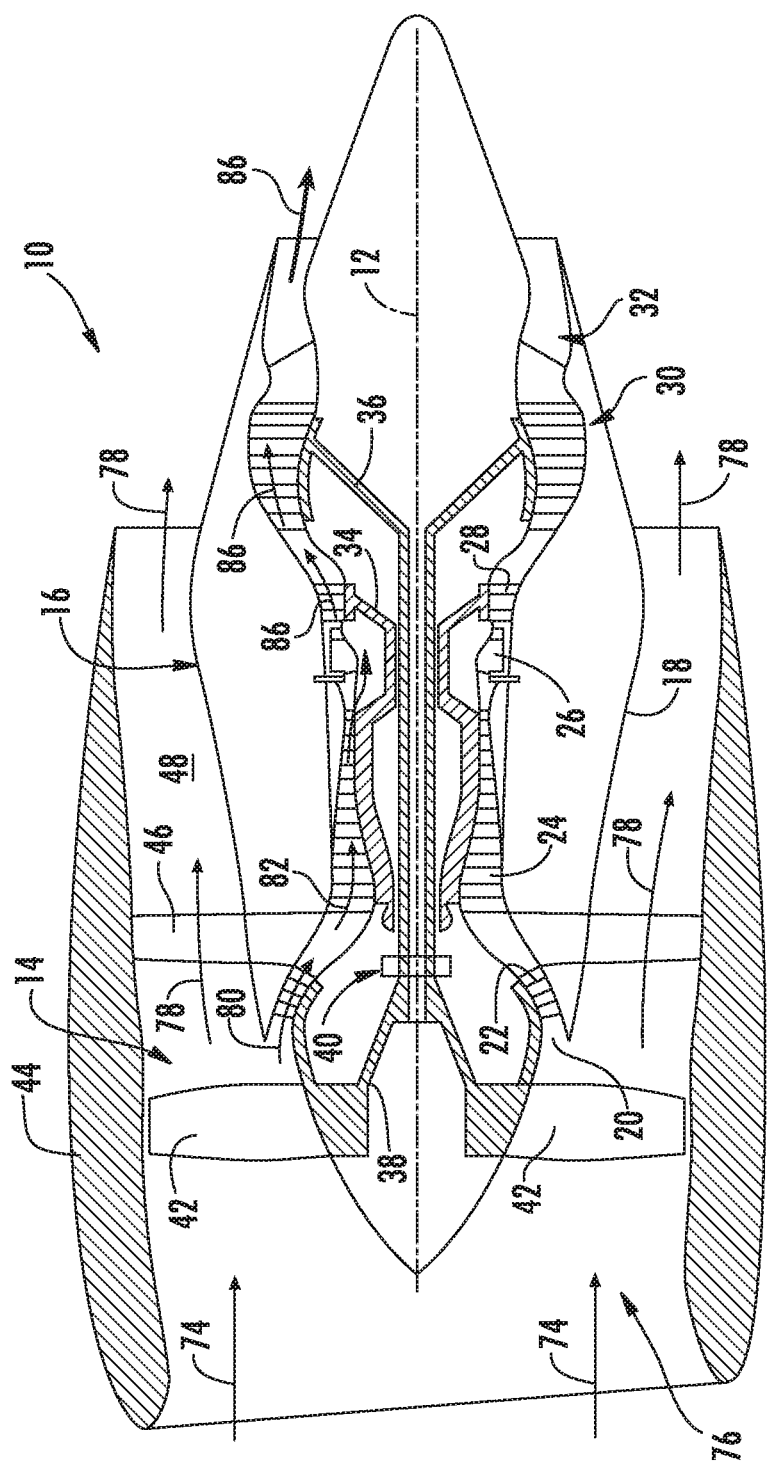
FIG. 1 is a schematic cross sectional view of an exemplary gas turbine engine incorporating an exemplary embodiment of a fuel nozzle and combustor assembly.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a fuel nozzle that may produce high-energy combustion while minimizing emissions and combustion instability at full power and part power conditions are generally provided. The fuel nozzle includes a plurality of fuel air mixing passages defining concentric, nested premixer annuli such as to beneficially provide relatively short, compact, flames at the combustion chamber such as to mitigate formation of oxides of nitrogen and other emissions (e.g., unburned hydrocarbons, smoke, carbon monoxide, carbon dioxide, etc.). The fuel nozzle defines hydraulic diameters that may further provide relatively short, compact flames at the combustion chamber such as to mitigate formation of oxides of nitrogen and other emissions while desirably meeting effective flow area targets. The shorter, more compact flames at the combustion chamber from the fuel nozzle may further enable a longitudinally shorter combustor assembly while providing similar or greater energy output as known combustion sections.

Referring now to the drawings, FIG. 1 is a schematic partially cross-sectioned side view of an exemplary high by-pass turbofan jet engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines, including marine and industrial turbine engines and auxiliary power units. As shown in FIG. 1, the engine 10 has a longitudinal or axial centerline axis 12 that extends there through for reference purposes. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14.

In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Figure 2:
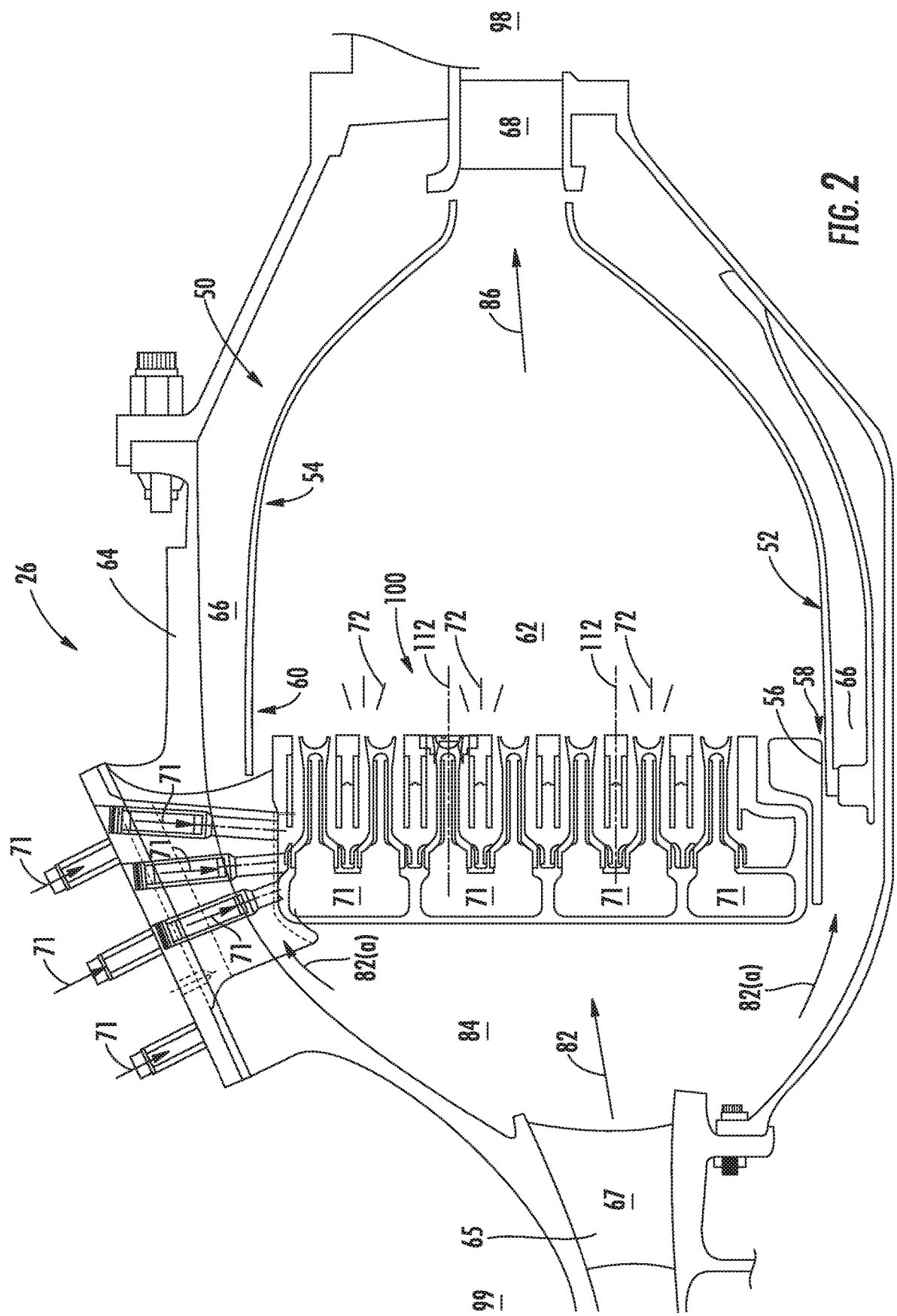
FIG. 2 is an axial cross sectional view of an exemplary embodiment of a combustor assembly of the exemplary engine shown in FIG. 1.

FIG. 2 is a cross sectional side view of an exemplary combustion section 26 of the core engine 16 as shown in FIG. 1. As shown in FIG. 2, the combustion section 26 may generally include an annular type combustor 50 having an annular inner liner 52, an annular outer liner 54 and a bulkhead wall 56 that extends radially between upstream ends 58, 60 of the inner liner 52 and the outer liner 54 respectfully. In other embodiments of the combustion section 26, the combustion assembly 50 may be a can or can-annular type. As shown in FIG. 2, the inner liner 52 is radially spaced from the outer liner 54 with respect to engine centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

As shown in FIG. 2, the inner liner 52 and the outer liner 54 may be encased within an outer casing 64. An outer flow passage 66 may be defined around the inner liner 52 and/or the outer liner 54. The inner liner 52 and the outer liner 54 may extend from the bulkhead wall 56 towards a turbine nozzle or inlet 68 to the HP turbine 28 (FIG. 1), thus at least partially defining a hot gas path between the combustor assembly 50 and the HP turbine 28. A fuel nozzle assembly 200 (fuel nozzle 100) may extend at least partially through the bulkhead wall 56 and provide a fuel-air mixture 72 to the combustion chamber 62.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 100. The compressed air 82 pressurizes the diffuser cavity 84. The compressed air 82 enters the fuel nozzle 100 and into a plurality of fuel injectors 100 within the fuel nozzle 100 to mix with a fuel 71. The fuel 71 may be a gaseous or liquid fuel, including, but not limited to, fuel oils, jet fuels propane, ethane, hydrogen, coke oven gas, natural gas, synthesis gas, or combinations thereof. The fuel injectors 100 premix fuel 71 and air 82 within the array of fuel injectors with little or no swirl to the resulting fuel-air mixture 72 exiting the fuel nozzle 100. After premixing the fuel 71 and air 82 within the fuel injectors 100, the fuel-air mixture 72 burns from each of the plurality of fuel injectors 100 as an array of compact, tubular flames stabilized from each fuel nozzle 100.

Typically, the LP and HP compressors 22, 24 provide more compressed air to the diffuser cavity 84 than is needed for combustion. Therefore, a second portion of the compressed air 82 as indicated schematically by arrows 82(a) may be used for various purposes other than combustion. For example, as shown in FIG. 2, compressed air 82(a) may be routed into the outer flow passage 66 to provide cooling to the inner and outer liners 52, 54. In addition or in the alternative, at least a portion of compressed air 82(a) may be routed out of the diffuser cavity 84. For example, a portion of compressed air 82(a) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

Figure 4:
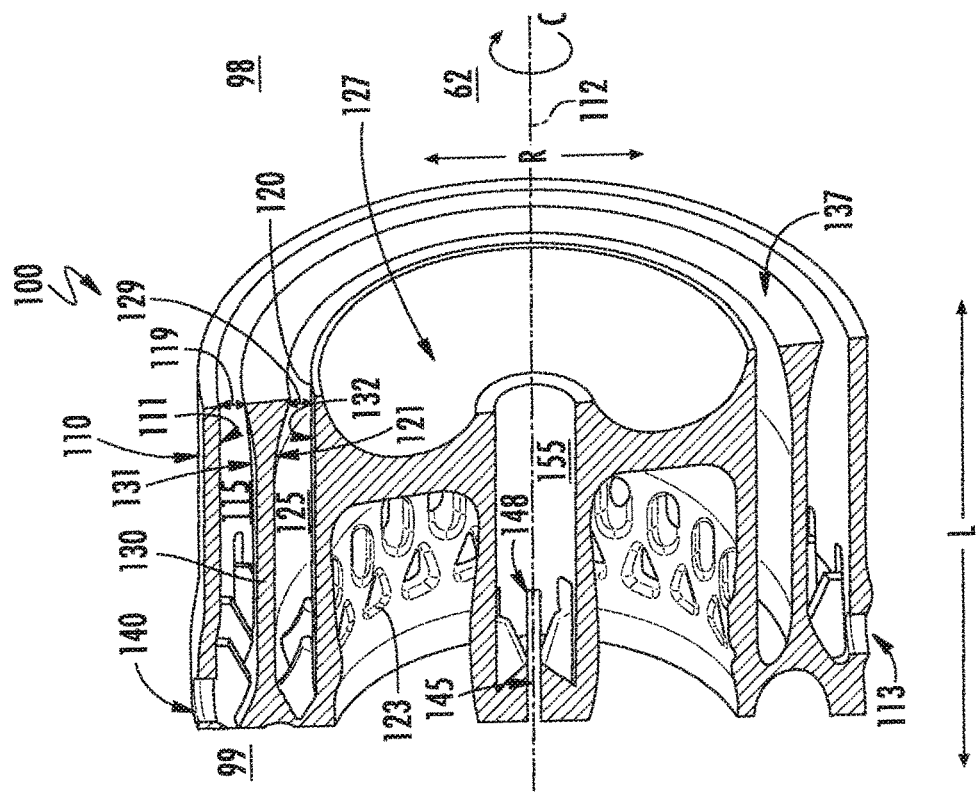
FIG. 4 is a cutaway perspective view of the fuel nozzle provided in regard to FIG. 3.
Figure 3:
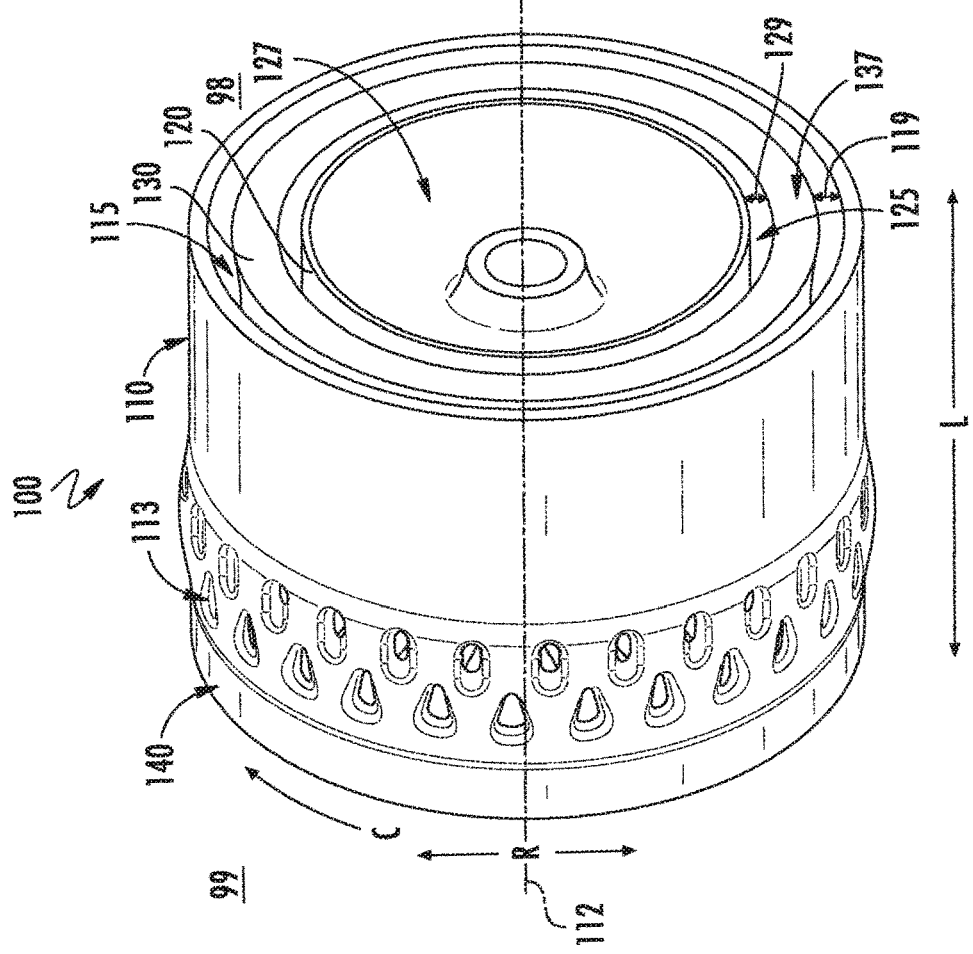
FIG. 3 is a perspective view of an exemplary embodiment of the fuel nozzle according to an aspect of the present disclosure.
Figure 5:
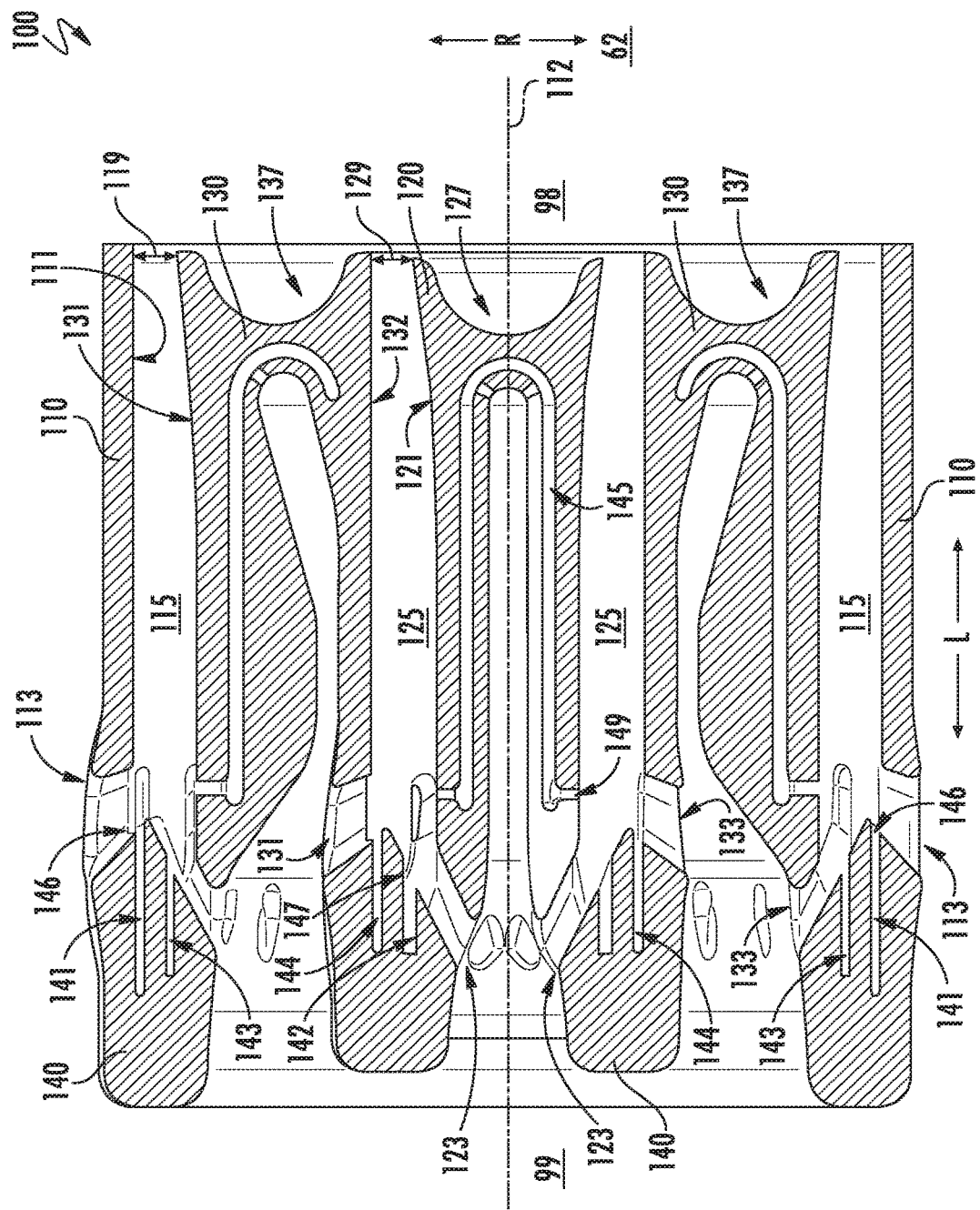
FIG. 5 is a longitudinal cross sectional view of an embodiment of the fuel nozzle according to an aspect of the present disclosure.
Figure 6:
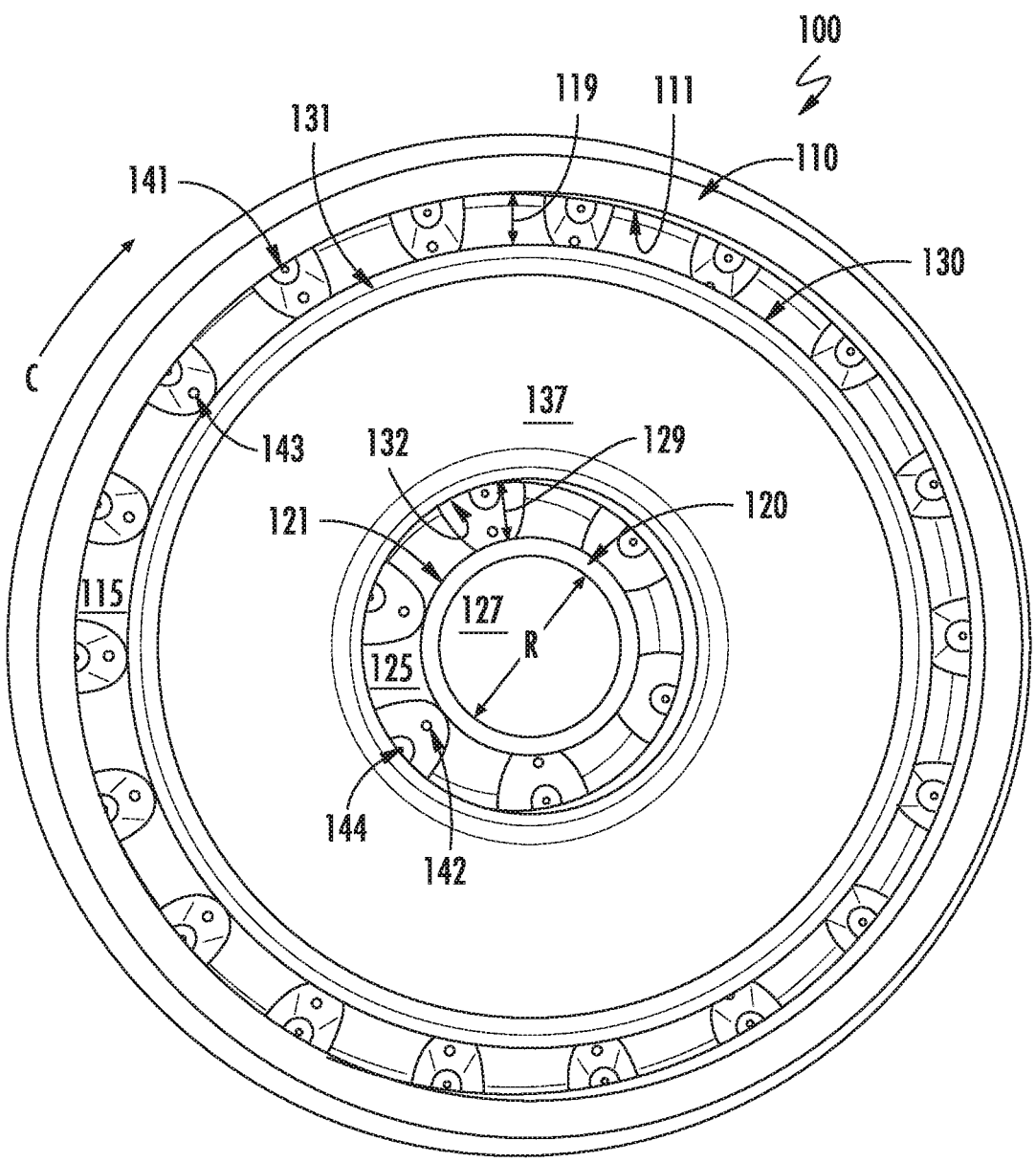
FIG. 6 is a flowpath view of an embodiment of the fuel nozzle according to aspects of the present disclosure.
Figure 7:
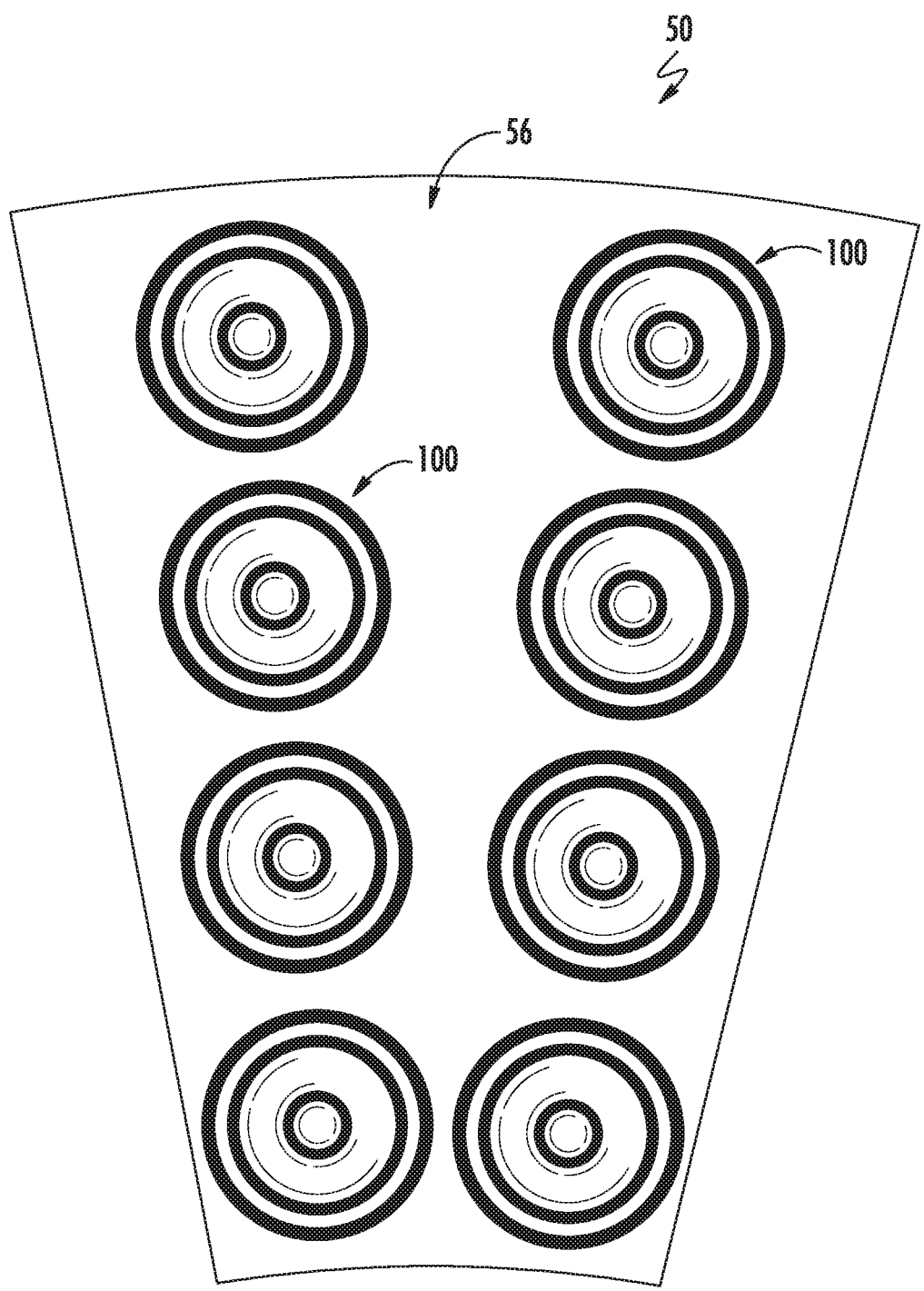
FIG. 7 is a flowpath view of a portion of an annular section of the combustor assembly of FIG. 2 including an exemplary embodiment of the fuel nozzles according to an aspect of the present disclosure.

Referring now to FIGS. 3-7, exemplary embodiments of the fuel nozzle 100 are generally provided. FIG. 3 provides a perspective view of an embodiment of the fuel nozzle 100. FIG. 4 provides a cutaway perspective view of the embodiment of the fuel nozzle 100 generally depicted in FIG. 3. FIG. 5 provides a cross sectional view of another embodiment of the fuel nozzle 100. FIGS. 6-7 provide exemplary cross sectional flowpath views from downstream looking upstream to the fuel nozzle 100. FIG. 7 provides an exemplary annular section of the combustor assembly 50 including an annular section of the bulkhead wall 56 and a plurality of fuel nozzles 100 extended therethrough.

Referring to FIGS. 3-5, the fuel nozzle 100 defines a reference fuel nozzle centerline 112 therethrough. The fuel nozzle 100 includes an outer sleeve 110 extended circumferentially around a fuel nozzle centerline 112. The outer sleeve 110 is further extended along a longitudinal direction L substantially co-directional to the fuel nozzle centerline 112. The outer sleeve 110 defines a plurality of first radially oriented air inlet ports 113 through the outer sleeve 110 in arranged along a circumferential direction C relative to the fuel nozzle centerline 112.

The fuel nozzle 100 further includes a centerbody 120 positioned inward along a radial direction R of the outer sleeve 110 relative to the fuel nozzle centerline 112. The centerbody 120 is extended along the longitudinal direction L substantially co-directional to the fuel nozzle centerline 112. The centerbody 120 is concentric to the fuel nozzle centerline 112 and the outer sleeve 110. The centerbody 120 further defines a plurality of second radially oriented air inlet ports 123 through the centerbody 120 in arranged along the circumferential direction C relative to the fuel nozzle centerline 112. The centerbody 120 defines an annular centerbody groove or depression 127 relative to the fuel nozzle centerline 112 at a downstream end 98 of the fuel nozzle 100 directly adjacent to the combustion chamber 62.

The fuel nozzle 100 further includes an inner sleeve 130 extended along the circumferential direction C around the fuel nozzle centerline 112. The inner sleeve 130 is extended along the longitudinal direction L substantially co-directional to the fuel nozzle centerline 112. The inner sleeve 130 is positioned radially (i.e., along radial direction R) between the outer sleeve 110 and the centerbody 120. The inner sleeve 130 defines an annular inner sleeve groove or depression 137 relative to the fuel nozzle centerline 112 at the downstream end 98 of the fuel nozzle 100 directly adjacent to the combustion chamber 62.

The outer sleeve 110 and the inner sleeve 130 together define a first fuel air mixing passage 115 therebetween along the radial direction R. The first fuel air mixing passage 115 is extended substantially along the longitudinal direction L in direct fluid communication with the combustion chamber 62. The inner sleeve 130 and the centerbody 120 together define a second fuel air mixing passage 125 therebetween along the radial direction R. The second fuel air mixing passage 125 is extended substantially along the longitudinal direction L in direct fluid communication with the combustion chamber 62.

In one embodiment, the first fuel air mixing passage 115 is extended along the circumferential direction C around the fuel nozzle centerline 112 between the outer sleeve 110 and the inner sleeve 130. In another embodiment, the second fuel air mixing passage 125 is extended along the circumferential direction C around the fuel nozzle centerline 112 between the inner sleeve 130 and the centerbody 120. In yet another embodiment, the outer sleeve 110, the inner sleeve 130, and the centerbody 120 are together in concentric arrangement relative to the fuel nozzle centerline 112. In still yet another embodiment, the first fuel air mixing passage 115 and the second fuel air mixing passage 125 are together in concentric arrangement relative to the fuel nozzle centerline 112.

In various embodiments, the first fuel air mixing passage 115 defines a first exit height 119 at the downstream end 98 of the first fuel air mixing passage 115 directly adjacent along the longitudinal direction L to the combustion chamber 62. The first exit height 119 is between an inner surface 111 of the outer sleeve 110 and an outer surface 131 of the inner sleeve 130 each extended substantially along the longitudinal direction L between each of which the first fuel air mixing passage 115 is defined. In one embodiment, the first exit height 119 is between approximately 0.25 centimeters and approximately 0.90 centimeters. In more particular embodiments, the first exit height 119 is defined between the inner surface 111 and the outer surface 131 within a distance equal to or less than the first exit height 119 from the combustion chamber 62 from the downstream end 98 of the first fuel air mixing passage 115. For example, the first exit height 119 is defined within the first fuel air mixing passage 115 within approximately 0.90 centimeters or less of the downstream end 98 of the first fuel air mixing passage 115. In still more particular embodiments, the first exit height 119 defines a hydraulic diameter of the first fuel air mixing passage 115.

In still various embodiments, the second fuel air mixing passage 125 defines a second exit height 129 at the downstream end 98 of the second fuel air mixing passage 125 directly adjacent along the longitudinal direction L to the combustion chamber 62. The second exit height 129 is between an inner surface 132 of the inner sleeve 130 and an outer surface 121 of the centerbody 120 each extended substantially along the longitudinal direction L between each of which the second fuel air mixing passage 125 is defined. In one embodiment, the second exit height 129 is between approximately 0.25 centimeters and approximately 0.90 centimeters. In more particular embodiments, the second exit height 129 is defined between the inner surface 132 and the outer surface 121 within a distance equal to or less than the second exit height 129 from the combustion chamber 62 from the downstream end 98 of the second fuel air mixing passage 125. For example, the second exit height 129 is defined within the second fuel air mixing passage 125 within approximately 0.90 centimeters or less of the downstream end 98 of the second fuel air mixing passage 125. In still more particular embodiments, the second exit height 129 defines a hydraulic diameter of the second fuel air mixing passage 125.

The fuel air mixing passages 115, 125 defining respective exit heights 119, 129 each defining a respective hydraulic diameter of the mixing passage 115, 125 may define the exit height 119, 129 at least in part as:

$$D_H = \frac{4A}{P}$$

wherein $D_H$ is the hydraulic diameter at the mixing passage 115, 125, A is the cross sectional area of the flow of fuel-air mixture through the mixing passage 115, 125, and P is the wetter perimeter of the cross section. It should be appreciated that the wetter perimeter is all or substantially all of the respective surfaces 111, 121, 131, 132 between which each exit height 119, 129 is defined along the circumferential direction C, such as generally depicted in regard to FIGS. 6-7. It should further be appreciated that the cross sectional area is defined at least in part by the area between the surfaces 111, 121, 131, 132 defining the respective mixing passages 115, 125. It should therefore be appreciated that embodiments of the fuel nozzle 100 may define the hydraulic diameter between approximately 0.25 centimeters and approximately 0.90 centimeters. In other embodiments, the hydraulic diameter may be greater or lesser based on the apparatus to which the fuel nozzle 100 is used (e.g., marine or industrial engines power generation, propulsion, auxiliary power generation, etc.).

The fuel nozzle 100 including the plurality of fuel air mixing passages 115, 125 may define concentric, nested premixer annuli such as to beneficially provide relatively short, compact, flames at the combustion chamber 62 such as to mitigate formation of oxides of nitrogen and other emissions. The fuel nozzle 100 defining the exit heights 119, 129 defining the hydraulic diameters further provide relatively short, compact flames at the combustion chamber 62 such as to mitigate formation of oxides of nitrogen and other emissions while desirably meeting effective flow area targets. The shorter, more compact flames at the combustion chamber 62 from the fuel nozzle 100 may further enable a longitudinally shorter combustor assembly 50 while providing similar or greater energy output as known combustion sections. In various embodiments, the fuel nozzle 100 provides shorter, more compact flames between approximately 0.60 centimeters and approximately 5.60 centimeters along the longitudinal direction L from the downstream end 98 of the fuel nozzle 100.

In various embodiments, flows of fuel-air mixture exiting each fuel air mixing passage 115, 125 may be imparted with a swirl such as to desirably alter, modify, or otherwise affect combustor flame stability and heat release, thereby improving lean blowout (LBO) margin, pressure oscillations, and combustion dynamics generally. The flow of fuel-air mixture exiting each fuel air mixing passage 115, 125 may be imparted via the flow of air entering each fuel air mixing passage 115, 125 through each respective radially oriented air inlet port 113, 123.

In one embodiment, the first radially oriented air inlet port 113 is in fluid communication with the first fuel air mixing passage 115 such as to provide a flow of air therethrough to mix with a flow of liquid or gaseous fuel. In another embodiment, the second radially oriented air inlet port 123 is in fluid communication with the second fuel air mixing passage 125 such as to provide a flow of air therethrough to mix with a flow of liquid or gaseous fuel. Various embodiments of the air inlet ports 113, 123 may be disposed along the radial direction R relative to the fuel nozzle centerline 112. Still various embodiments of the air inlet ports 113, 123 may further be disposed at least partially tangentially relative to the fuel nozzle centerline 112, such as to further impart a swirl to the air entering the respective fuel air mixing passages 115, 125 along the circumferential direction C relative to the fuel nozzle centerline 112. In still yet various embodiments, the air inlet ports 113, 123 may be configured such as to impart a substantially longitudinal flow through one or more of the mixing passages 115, 125 such as to mitigate providing a swirl to the flow of air entering the mixing passage 115, 125 or a swirl to the fuel-air mixture exiting the mixing passage 115, 125.

Referring still to FIGS. 3-5, although the fuel air mixing passages 115, 125 are depicted as extended substantially along the longitudinal direction L, in various embodiments the fuel air mixing passages 115, 125 may be extended in serpentine arrangement, or include a plurality of lobes or protuberances, such as to induce turbulence of the flow of fuel and/or air at each respective mixing passage 115, 125.

In one embodiment of the fuel nozzle 100, the annular centerbody depression 127 defines a substantially semicircular cross sectional centerbody depression into the centerbody 110. In another embodiment of the fuel nozzle 100, the annular inner sleeve depression 137 defines a substantially semi-circular cross sectional depression into the inner sleeve 130. Each depression 127, 137 extended away from the combustion chamber 62 generally defines a bluff body flame stabilizer such as to improve LBO margin, combustion dynamics, and overall engine operability.

Referring still to FIGS. 3-5, in various embodiments the fuel nozzle 100 further includes an end wall 140 positioned at an upstream end 99 of the fuel nozzle 100 in which the end wall 140 is attached, coupled, or formed directly to the outer sleeve 110, the inner sleeve 130, and the centerbody 120. The end wall 140 is configured to support the outer sleeve 110, the inner sleeve 130, and the centerbody 120 in concentric arrangement around the fuel nozzle centerline 112.

Referring more clearly to FIG. 5, the end wall 140 is configured to receive liquid and/or gaseous fuel from a fuel system (not shown) and provide the fuel to the mixing passages 115, 125 for mixing with air and combustion at the combustion chamber 62. In various embodiments, the end wall 140 defines a first fuel injection port 141 in fluid communication with the first fuel air mixing passage 115. The end wall 140 is configured to provide a flow of fuel to the first fuel air mixing passage 115 via the first fuel injection port 141. In one embodiment, the first fuel injection port 141 is extended substantially along the longitudinal direction L. The longitudinally extended first fuel injection port 141 may provide a substantially longitudinal flow of fuel through the first fuel injection port 141 to the first fuel air mixing passage 115. However, in other embodiments, the plurality of first radially oriented air inlet ports 113 may impart a swirl to the flow of air entering the first fuel air mixing passage 115, such as to provide a swirl along the circumferential direction C of the fuel-air mixture in the first fuel air mixing passage 115.

In one embodiment, the plurality of first radially oriented air inlet ports 113 are defined directly outward along the radial direction R of a first fuel injection exit opening 146 defined at the first fuel injection port 141 in direct fluid communication with the first fuel air mixing passage 115. For example, the first fuel injection exit opening 146 is defined at the downstream end 98 of the first fuel injection port 141 such as to define a plane at which fuel exits the first fuel injection port 141 and enters the first fuel air mixing passage 115. The first fuel injection exit opening 146 defining such a plane may be defined directly inward along the radial direction R of the plurality of first radially oriented air inlet ports 113.

Referring still to FIG. 5, in still various embodiments, the end wall 140 defines a second fuel injection port 142 in fluid communication with the second fuel air mixing passage 125. The end wall 140 is configured to provide a flow of fuel to the second fuel air mixing passage 125 via the second fuel injection port 142. In one embodiment, the second fuel injection port 142 is extended substantially along the longitudinal direction L. The longitudinally extended second fuel injection port 142 may provide a substantially longitudinal flow of fuel through the second fuel injection port 142 to the first fuel air mixing passage 115. However, in other embodiments, the plurality of second radially oriented air inlet ports 123 may impart a swirl to the flow of air entering the second fuel air mixing passage 125, such as to provide a swirl along the circumferential direction C of the fuel-air mixture in the second fuel air mixing passage 125.

In one embodiment, the plurality of second radially oriented air inlet ports 123 are defined directly inward along the radial direction R of a second fuel injection exit opening 147 defined at the second fuel injection port 142 in direct fluid communication with the second fuel air mixing passage 125. For example, the second fuel injection exit opening 147 is defined at the downstream end 98 of the second fuel injection port 142 such as to define a plane at which fuel exits the second fuel injection port 142 and enters the second fuel air mixing passage 125. The second fuel injection exit opening 147 defining such a plane may be defined directly outward along the radial direction R of the plurality of second radially oriented air inlet ports 123.

Referring still to FIG. 5, in another embodiment, the inner sleeve 130 may define a plurality of third radially oriented air inlet ports 133 through the inner sleeve 130 in circumferential arrangement relative to the fuel nozzle centerline 112. In one embodiment, the plurality of third radially oriented air inlet ports 133 may be defined through the inner sleeve 130 in fluid communication with the first fuel air mixing passage 115. The plurality of third radially oriented air inlet ports 133 may be defined inward along the radial direction R of the plurality of first radially oriented air inlet ports 113. The plurality of third radially oriented air inlet ports 133 may further be defined directly inward along the radial direction R of a third fuel injection port 143 extended along the longitudinal direction L through the end wall 140. The third fuel injection port 143 may be defined inward along the radial direction R of the first fuel injection port 141. The plurality of first radially oriented air inlet ports 113 may generally be disposed radially opposing the plurality of third radially oriented air inlet ports 133. Each of the first fuel injection ports 141 and third fuel injection ports 143 may be defined radially between the opposing first radially oriented air inlet ports 113 and third radially oriented air inlet ports 133.

In another embodiment, the plurality of third radially oriented air inlet ports 133 may be defined through the inner sleeve 130 in fluid communication with the second fuel air mixing passage 125. The plurality of third radially oriented air inlet ports 133 may be defined outward along the radial direction R of the plurality of second radially oriented air inlet ports 123. The plurality of third radially oriented air inlet ports 133 may further be defined directly outward along the radial direction R of a fourth fuel injection port 144 extended along the longitudinal direction L through the end wall 140. The fourth fuel injection port 144 may be defined outward along the radial direction R of the second fuel injection port 142. The plurality of second radially oriented air inlet ports 123 may generally be disposed radially opposing the plurality of third radially oriented air inlet ports 133. Each of the second fuel injection ports 142 and fourth fuel injection ports 144 may be defined radially between the opposing second radially oriented air inlet ports 123 and third radially oriented air inlet ports 133.

Embodiments of the fuel nozzle 100 including the radially opposing radially oriented air inlet ports and one or more of the fuel injection ports defined radially therebetween may improve mixing of fuel and air at the mixing passages, such as via shearing the flow of air with the flow fuel substantially longitudinally exiting the fuel injection ports. The improved mixing of fuel and air, in addition to the concentric arrangement of fuel air mixing passages 115, 125, or additionally the hydraulic diameter, may provide desirably shorter, more compact, flames at the combustion chamber 62 such as described herein.

Referring to FIGS. 4-5, in various embodiments, the centerbody 120 may define a centerbody fuel injection port 145 extended within the centerbody 120. The centerbody fuel injection port 145 may define a circuit within the centerbody 120, such as to provide heat transfer between the fuel and the centerbody 120. The heat transfer between the fuel and the centerbody 120 may improve properties of the fuel, such as to reduce viscosity, mitigate coking, or otherwise improve mixing and combustion. The heat transfer between the fuel and the centerbody 120 may further improve durability of the centerbody 120, such as to provide thermal attenuation.

Referring to FIG. 4, in one embodiment, the centerbody 120 defines a substantially radially oriented centerbody fuel injection port 145 configured to provide a jet-in-crossflow flow of fuel through a radially oriented centerbody fuel injection exit opening 149 to the second fuel air mixing passage 125.

Referring to FIG. 5, in another embodiment, the centerbody 120 defines a substantially longitudinally extended centerbody fuel injection port 145 configured to provide a substantially longitudinal flow of fuel through a longitudinally oriented centerbody fuel injection exit opening 149 to the combustion chamber 62. In yet another embodiment, such as depicted in regard to FIG. 5, the centerbody 120 defines a longitudinally extended cavity 155 radially within the centerbody 120 in fluid communication with the combustion chamber 62 through which the flow of fuel from the centerbody fuel injection port 145 flows to the combustion chamber 62.

Although embodiments of the fuel nozzle 100 generally provided herein depict the outer sleeve 110, the centerbody 120, and the inner sleeve 130 together in concentric arrangement to form the first fuel air mixing passage 115 and the second fuel air mixing passage 125, it should be appreciated that in other embodiments a plurality of the inner sleeve 130 may be disposed between the outer sleeve 110 and the centerbody 130 to form a plurality of additional fuel air mixing passages radially therebetween.

The fuel nozzle 100 and combustor assembly 50 shown in FIGS. 1-7 and described herein may be constructed as an assembly of various components that are mechanically joined or arranged such as to produce the fuel nozzle 100 shown and described herein. The fuel nozzle 100 may alternatively be constructed as a single, unitary component and manufactured from any number of processes commonly known by one skilled in the art. These manufacturing processes include, but are not limited to, those referred to as "additive manufacturing" or "3D printing". Additionally, any number of casting, machining, welding, brazing, or sintering processes, or mechanical fasteners, or any combination thereof, may be utilized to construct the fuel nozzle 100 or the combustor assembly 50. Furthermore, the fuel nozzle 100 may be constructed of any suitable material for turbine engine combustor sections, including but not limited to, nickel- and cobalt-based alloys. Still further, flowpath surfaces may include surface finishing or other manufacturing methods to reduce drag or otherwise promote fluid flow, such as, but not limited to, tumble finishing, barreling, rifling, polishing, or coating.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fuel nozzle for a gas turbine engine, the fuel nozzle comprising:
an outer sleeve extended circumferentially around a fuel nozzle centerline and extended along a longitudinal direction substantially co-directional to the fuel nozzle centerline, wherein the outer sleeve defines a plurality of first radially oriented air inlet ports through the outer sleeve in circumferential arrangement relative to the fuel nozzle centerline;
a centerbody positioned radially inward of the outer sleeve, wherein the centerbody is extended along the longitudinal direction substantially co-directional to the fuel nozzle centerline and wherein the centerbody is concentric to the fuel nozzle centerline and the outer sleeve, and further wherein the centerbody defines a plurality of second radially oriented air inlet ports through the centerbody in circumferential arrangement relative to the fuel nozzle centerline, and wherein the centerbody defines an annular centerbody depression relative to the fuel nozzle centerline at a downstream end directly adjacent to a combustion chamber; and
an inner sleeve extended circumferentially around the fuel nozzle centerline and extended along the longitudinal direction substantially co-directional to the fuel nozzle centerline, wherein the inner sleeve is positioned radially between the outer sleeve and the centerbody, and wherein the inner sleeve defines an annular inner sleeve depression relative to the fuel nozzle centerline at the downstream end directly adjacent to the combustion chamber;
wherein the outer sleeve and the inner sleeve together define a first fuel air mixing passage radially therebetween and extended substantially along the longitudinal direction in direct fluid communication with the combustion chamber wherein the first fuel air mixing passage is fed by the plurality of first radially oriented air inlet ports, and further wherein the inner sleeve and the centerbody together define a second fuel air mixing passage radially therebetween and extended substantially along the longitudinal direction in direct fluid communication with the combustion chamber wherein the second fuel air mixing passage is fed by the plurality of second radially oriented air inlet ports.

2. The fuel nozzle of claim 1, wherein the first fuel air mixing passage is extended circumferentially around the fuel nozzle centerline between the outer sleeve and the inner sleeve.

3. The fuel nozzle of claim 1, wherein the second fuel air mixing passage is extended circumferentially around the fuel nozzle centerline between the inner sleeve and the centerbody.

4. The fuel nozzle of claim 1, wherein the outer sleeve, the inner sleeve, and the centerbody are in concentric arrangement relative to the fuel nozzle centerline.

5. The fuel nozzle of claim 4, wherein the first fuel air mixing passage and the second fuel air mixing passage are in concentric arrangement relative to the fuel nozzle centerline.

6. The fuel nozzle of claim 1, further comprising:
an end wall positioned at an upstream end of the fuel nozzle, wherein the end wall is coupled to the outer sleeve, the inner sleeve, and the centerbody.

7. The fuel nozzle of claim 6, wherein the end wall defines a first fuel injection port in fluid communication with the first fuel air mixing passage, wherein the end wall is configured to provide a flow of fuel to the first fuel air mixing passage via the first fuel injection port.

8. The fuel nozzle of claim 7, wherein the plurality of first radially oriented air inlet ports are defined directly radially outward of a first fuel injection exit opening defined at the first fuel injection port in direct fluid communication with the first fuel air mixing passage.

9. The fuel nozzle of claim 7, wherein the first fuel injection port is extended substantially along the longitudinal direction.

10. The fuel nozzle of claim 6, wherein the end wall defines a second fuel injection port in fluid communication with the second fuel air mixing passage, wherein the end wall is configured to provide a flow of fuel to the second fuel air mixing passage via the second fuel injection port.

11. The fuel nozzle of claim 10, wherein the plurality of second radially oriented air inlet ports are defined directly radially inward of a second fuel injection exit opening defined at the second fuel injection port in direct fluid communication with the second fuel air mixing passage.

12. The fuel nozzle of claim 10, wherein the second fuel injection port is extended substantially along the longitudinal direction.

13. The fuel nozzle of claim 1, wherein the centerbody defines a substantially radially oriented centerbody fuel injection port configured to provide a jet-in-crossflow flow of fuel to the second fuel air mixing passage.

14. The fuel nozzle of claim 1, wherein the centerbody defines a substantially longitudinally oriented centerbody fuel injection port configured to provide a substantially longitudinal flow of fuel to the combustion chamber.

15. The fuel nozzle of claim 1, wherein the inner sleeve defines a plurality of third radially oriented air inlet ports through the inner sleeve in circumferential arrangement relative to the fuel nozzle centerline.

16. The fuel nozzle of claim 1, wherein the first fuel air mixing passage defines a first exit height at a downstream end of the first fuel air mixing passage directly adjacent to the combustion chamber, wherein the first exit height is between an inner surface of the outer sleeve and an outer surface of the inner sleeve, and further wherein the first exit height is between 0.25 centimeters and 0.90 centimeters.

17. The fuel nozzle of claim 1, wherein the second fuel air mixing passage defines a second exit height at a downstream end of the second fuel air mixing passage directly adjacent to the combustion chamber, wherein the second exit height is between an inner surface of the inner sleeve and an outer surface of the centerbody, and further wherein the second exit height is between 0.25 centimeters and 0.90 centimeters.

18. The fuel nozzle of claim 1, wherein the annular centerbody depression defines a substantially semi-circular cross sectional centerbody depression into the centerbody.

19. The fuel nozzle of claim 1, wherein the annular inner sleeve depression defines a substantially semi-circular cross sectional depression into the inner sleeve.

20. A gas turbine engine, the gas turbine engine comprising:
a combustion section comprising a combustor assembly defining a combustion chamber, and wherein the combustion section further comprises a fuel nozzle disposed adjacent to the combustion chamber configured to provide a flow of fuel to the combustion chamber, wherein the fuel nozzle comprises; an outer sleeve extended circumferentially around a fuel nozzle centerline and extended along a longitudinal direction substantially co- directional to the fuel nozzle centerline, wherein the outer sleeve defines a plurality of first radially oriented air inlet ports through the outer sleeve in circumferential arrangement relative to the fuel nozzle centerline;
a centerbody positioned radially inward of the outer sleeve, wherein the centerbody is extended along the longitudinal direction substantially co- directional to the fuel nozzle centerline and wherein the centerbody is concentric to the fuel nozzle centerline and the outer sleeve, and further wherein the centerbody defines a plurality of second radially oriented air inlet ports through the centerbody in circumferential arrangement relative to the fuel nozzle centerline, and wherein the centerbody defines an annular centerbody depression relative to the fuel nozzle centerline at a downstream end directly adjacent to a combustion chamber; and
an inner sleeve extended circumferentially around the fuel nozzle centerline and extended along the longitudinal direction substantially co- directional to the fuel nozzle centerline, wherein the inner sleeve is positioned radially between the outer sleeve and the centerbody, and wherein the inner sleeve defines an annular inner sleeve depression relative to the fuel nozzle centerline at the downstream end directly adjacent to the combustion chamber;
wherein the outer sleeve and the inner sleeve together define a first fuel air mixing passage radially therebetween and extended substantially along the longitudinal direction in direct fluid communication with the combustion chamber wherein the first fuel air mixing passage is fed by the plurality of first radially oriented air inlet ports, and further wherein the inner sleeve and the centerbody together define a second fuel air mixing passage radially therebetween and extended substantially along the longitudinal direction in direct fluid communication with the combustion chamber wherein the second fuel air mixing passage is fed by the plurality of second radially oriented air inlet ports.

\* \* \* \* \*